April 26, 1966 A. E. PETERS 3,247,762

OPAQUE MICROPHOTOGRAPH READER

Filed May 17, 1963 4 Sheets-Sheet 1

INVENTOR.
Arnis Edward Peters
BY
Bair, Freeman & Molinare
Attys.

OPAQUE MICROPHOTOGRAPH READER

Filed May 17, 1963 4 Sheets-Sheet 2

INVENTOR.
Arnis Edward Peters
BY
Bair, Freeman, & Molinare
Attys.

April 26, 1966 A. E. PETERS 3,247,762

OPAQUE MICROPHOTOGRAPH READER

Filed May 17, 1963 4 Sheets-Sheet 3

INVENTOR.
Arnis Edward Peters
BY
Bair, Freeman & Molinare
Attys.

April 26, 1966 A. E. PETERS 3,247,762

OPAQUE MICROPHOTOGRAPH READER

Filed May 17, 1963 4 Sheets-Sheet 4

INVENTOR.

Arnis Edward Peters.

BY

Bair, Freeman & Molinare.

Attys.

United States Patent Office 3,247,762
Patented Apr. 26, 1966

3,247,762

OPAQUE MICROPHOTOGRAPH READER

Arnis E. Peters, La Crosse, Wis., assignor to The Microcard Reader Corporation, Salem, Wis., a corporation of Wisconsin Filed May 17, 1963, Ser. No. 281,283
8 Claims. (Cl. 88—24)

This invention relates to microphotograph readers and it particularly relates to an articulated microphotograph reader which, when not in use, may be folded into an extremely compact package so as to be readily transportable.

In U.S. Patent No. 2,700,917, issued Feb. 1, 1955, there was disclosed and claimed a microphotograph viewer which has been quite successful commercially. However, that viewer has the disadvantage of being bulky and quite unwieldy to move from place to place. Clearly, it would be highly advantageous if a compact and readily movable microphotograph reader could be provided, while at the same time preserving the advantages of the viewer described in the aforementioned patent.

Therefore, it is a primary object of this invention to provide an articulated microphotograph viewer which, when not in use, may be folded into an extremely compact package so as to be readily transportable.

It is an additional object of this invention to provide a microphotograph reader which, while in the working position, may be used for viewing a microphotograph and, while in the closed position, may be readily stored or transported.

It is a further object of this invention to provide a compact, portable microphotograph viewer which is particularly characterized by being simply and economically constructed.

Further purposes and objects of this invention will appear as the specification proceeds.

Generally, my microphotograph viewer comprises a base that defines a first compartment and a second compartment; means for holding the microphotograph in viewing position adjacent the first compartment, wherein the first compartment contains means for directing light against the microphotograph, means for focusing the image reflected from the microphotograph and a first reflecting means for reflecting the image; a cover pivotally mounted on the base and being adapted to enclose the second compartment; a second reflecting means positioned on the inner surface of the cover and, when the cover is in the raised position, being adapted to reflect the image projected from the first reflecting means; and a viewing screen pivotably mounted on the base and, when in the raised position, being adapted to receive the image which is projected from the second reflecting means, whereby a desired portion of the microphotograph may be viewed on the screen.

One embodiment of the present invention is illustrated in the accompanying drawings, wherein.

Figures 1, 7:
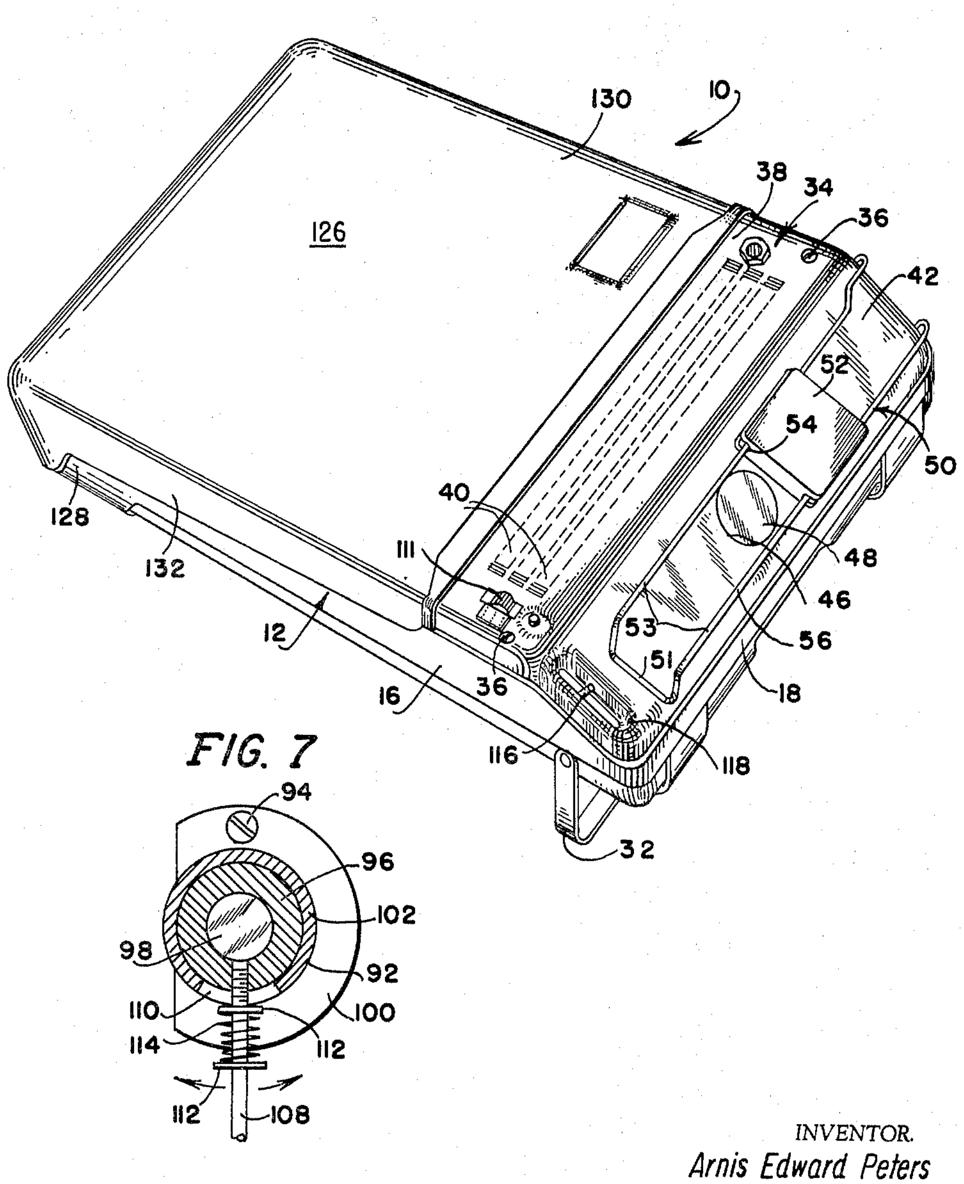
FIGURE 1 is a perspective view of my microphotograph viewer in the closed position.
FIGURE 7 is an enlarged fragmentary sectional view taken along line 7—7 of FIGURE 5.

The microphotograph viewer 10 is provided with a base 12 having a bottom 14, a pair of upwardly projecting side walls 16 and a front wall 18 which is somewhat shorter than the major portion of the side walls 16.

The base portion 12 includes an upright dividing wall 20 which divides the base 12 into a first or front compartment 22 and a second or rear compartment 24. The dividing wall 20 is transversely positioned between and mounted on the side walls 16 and defines a front compartment 22 which is substantially smaller in volume than the rear compartment 24. Also, the dividing wall 20 is provided with a non-circular opening 26 at its central portion.

Figure 3:
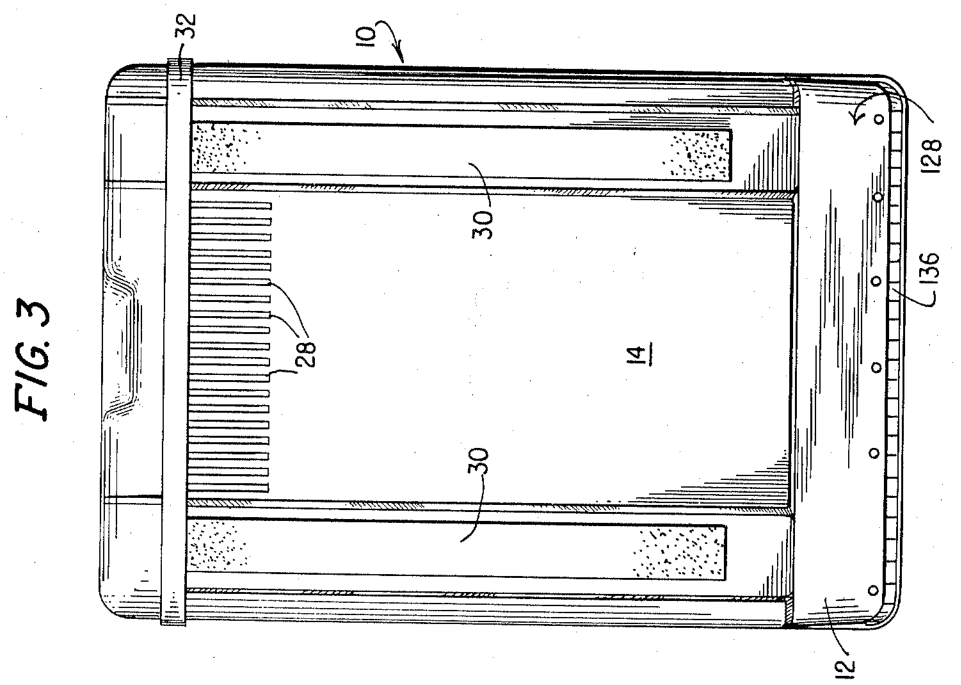
FIGURE 3 is a bottom plan view of the embodiment of FIGURE 1.
Figure 2:
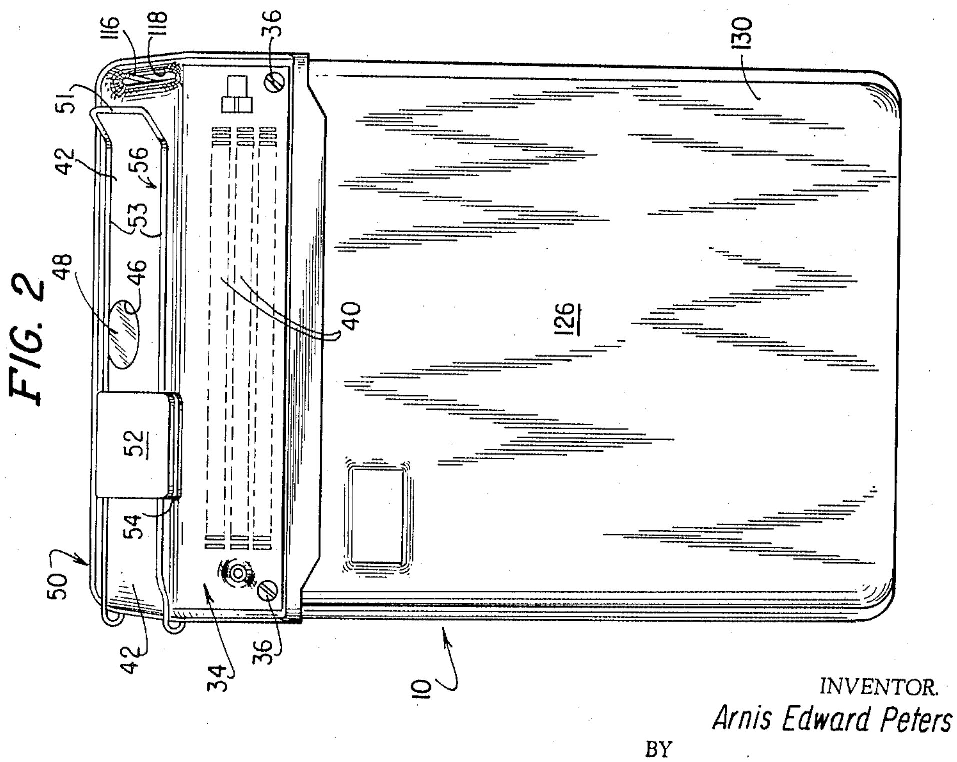
FIGURE 2 is a top plan view of the embodiment of FIGURE 1.
Figure 4:
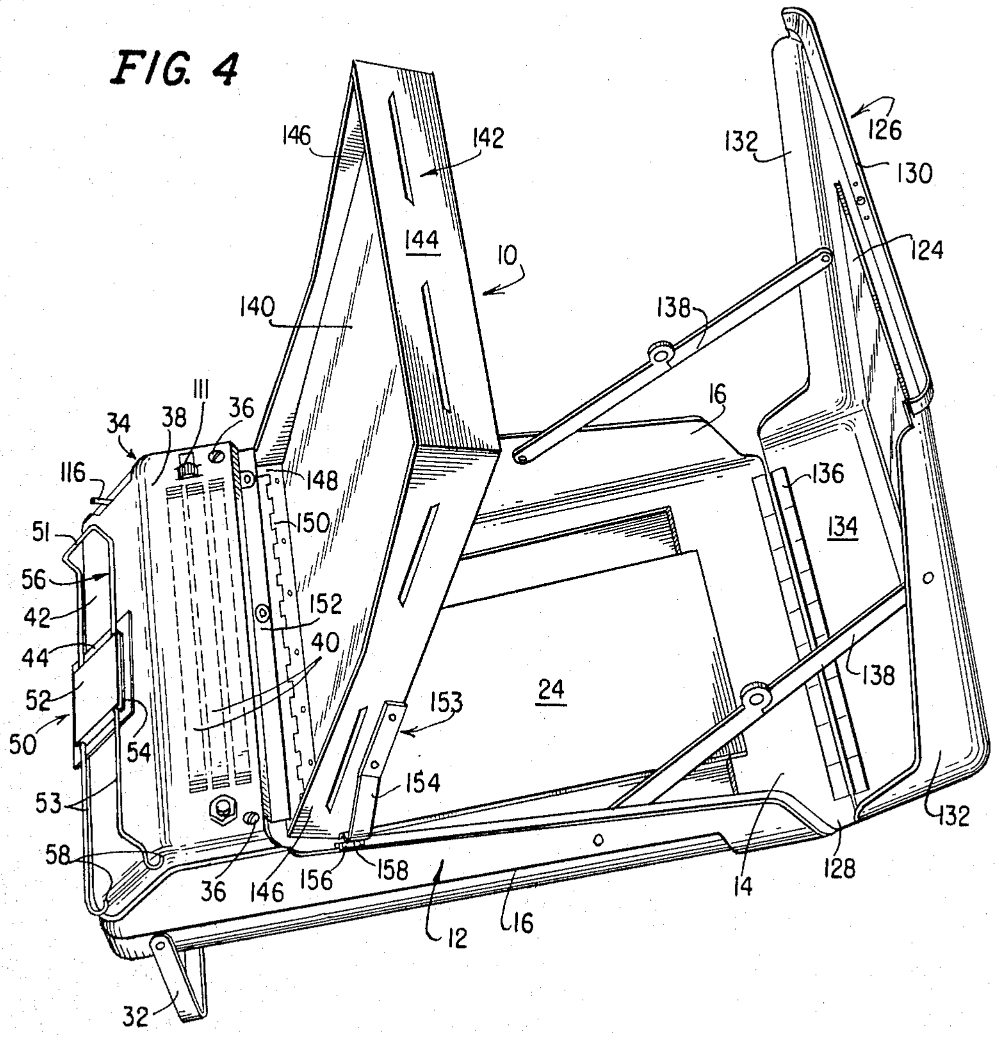
FIGURE 4 is a perspective view of my microphotograph viewer in the open and operating position.

Referring particularly to FIGURE 3, the bottom wall 14 of the base 12 is provided with a plurality of elongated air vents 28 which allow air to circulate upwardly through the first compartment 22. The bottom 14 also has resilient support pads 30 which raise the viewer 10 off its supporting surface whereby air freely passes upwardly through the vents 28. As illustarted, most clearly in FIGURES 1 and 4, a handle 32 is pivotally mounted to the side walls 16 at the front portion of the base 12. The handle 32 serves two purposes in that it not only acts as a convenient handle for carrying the viewer 10, but it may also act as a stand, as shown in FIGURE 4, when the viewer 10 is in the working position, both to provide a more convenient angle of viewing and to permit better ingestion of cooling air through the air vents 28.

The base 12 may be constructed of any substantially rigid material and is conveniently made of relatively light weight metal, such as aluminum or magnesium. Also, the base 12 may be molded from plastic material. Further, it is preferable that the interior surfaces of the base 12 be black in order to reduce undesired reflection which would be likely to interfere with clear viewing of the microphotograph.

A casing or cover 34 is adapted to generally enclose the front compartment 22 and is secured to the base 12 by suitable fastening means, as screws 36. Specifically, the casing 34 is secured in position so as to substantially enclose the space between the dividing wall 20, the front wall 18 and the side walls 16 of the base 12. The top 38 of the cover 34 includes a plurality of vent openings 40 which co-operate with the air vents 28 in the bottom 14 whereby air freely circulates upwardly through the front compartment 22 so as to withdraw some of the heat generated by the lamp 60 and the transformer 61. The cover 34 also has a frontwardly slanted wall 42 which includes an aperture 46. The aperture 46 receives a contact glass 48, against which a microphotograph 44 may be positioned for viewing purposes.

The microphotograph 44 is maintained firmly against the contact glass 48 by the hold down or pressure means, generally 50. The hold down means 50 includes a slidable block 52 having slots 54. The block 52 is slidably positioned on the track member 56 which in turn is slidably carried by the front cover 34. The track member 56 is constructed of wire and is formed to provide a closed end 51 which connects the opposed rails 53 which receive the slots 54 of the slidable block 52. Each rail 53 is looped at the end opposite the closed end 51 whereby each rail 53 is reversed and is slidably directed through the side openings 58 provided in the cover 34. The track member 56 is adapted to cause the block 52 to be biased towards the contact glass 48, thereby causing the microphotograph to be trapped between the block 52 and the contact glass 48 so that the microphotograph 44 is maintained substantially flush against the glass 48.

Figure 5:
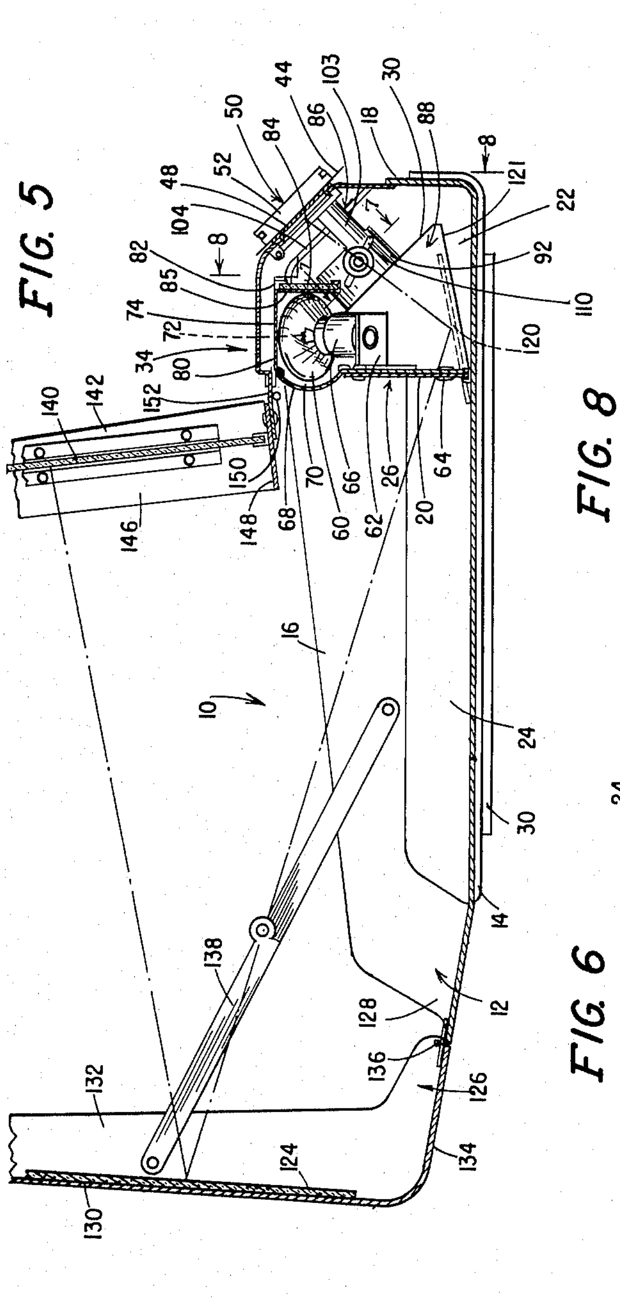
FIGURE 5 is a longitudinal sectional view of the microphotograph reader while in the operating position.
Figure 8:
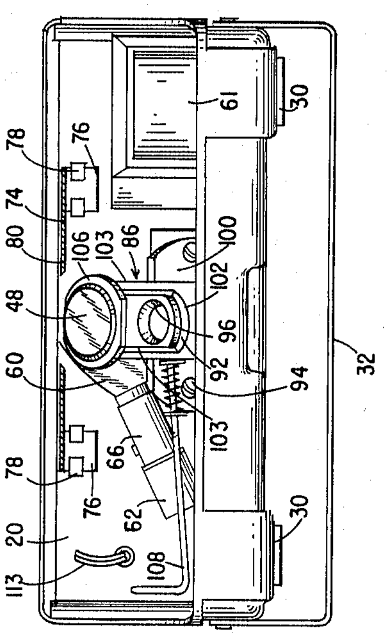
FIGURE 8 is a sectional view taken along line 8—8 of FIGURE 5.
Figure 6:
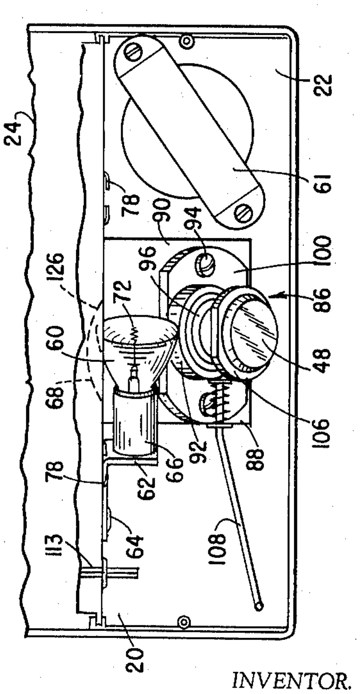
FIGURE 6 is a top plan view of the light directing means and the focusing means positioned in the first compartment of the viewer.

Referring particularly to FIGURES 5 and 6, the high wattage lamp 60 is positioned in the first compartment 22 and is mounted in the bayonet socket 66. The socket 66 is secured to the bracket 62, which in turn is fastened to the dividing wall 20 by the screw 64.

Carried in the upper central portion of the dividing wall 20 and adjacent the lamp 60 is a concave reflector 68 which is positioned so that the central portion 70 of the reflector 68 is in alignment with the filament 72 of the lamp 60. In this position, a great intensity of light is projected by the reflector 68 from the lamp 60 against the microphotograph 44.

Also mounted adjacent to the lamp 60 is a lamp guard 74 which is detachably mounted to the dividing wall 20. The guard 74 is provided with downwardly turned tongues 76 which are adapted to be firmly positioned within slots 78 provided at the upper portion of the dividing wall 20. The guard 74 also includes an upper surface 80 and a depending front wall 82. The front wall 82 carries a heat absorbing glass 84 which covers an open portion 85 in the front wall 82. The glass 84 is adapted to absorb some of the heat emitted by the lamp 60.

The light from the lamp 60 passes through the glass 84, through the contact glass 48 and against the microphotograph 44, which is held in position between the block 52 and the contact glass 48. The brightly illuminated surface of the microphotograph 44 is then directed downwardly through the focusing apparatus 86. The focusing apparatus 86 is mounted directly on the central housing 88 which projects into the front compartment 22 and is positioned around the opening 26 in the dividing wall 20.

The focusing apparatus 86 includes a hollow base member 92, which is mounted on the slanted forward wall 90 of the housing 88 by screws 94, and a slidable member 96 which is slidably positioned within the hollow base member 92. The slidable lens member 96 carries lenses, as 98, for focusing the image projected from the microphotograph 44. The base 92 includes a flanged bottom 100 having openings for receiving the screws 94 for securing the focusing apparatus 86 to the forward wall 90 of the housing 88. A generally cylindrical side wall 102 projects upwardly from the bottom 100. At the upper end of the side wall 102, a pair of extended arms 103 project upwardly and provide support for the contact glass mounting 106. The contact glass support 106 is provided with a recess for receiving the contact glass 48. A wide opening 104 is provided between the arms 103, enabling the light being projected from the lamp 60 to pass to the contact glass 48 and against the microphotograph 44.

The inner surface of the hollow base member 92 provides a bearing surface for the slidable member 96 and by moving the slidable member 96 up and down within the support member 92, the image being projected from the microphotograph 44 is focused by the lenses which are mounted in the slidable member.

The upward and downward movement of the slidable member 96 is accomplished by a lever arm 108 which is threadably mounted in the slidable portion 96, as shown in FIGURE 7. The lever arm 108 passes through the very steep, slanted helical cam slot 110 provided in the wall 102 of the base 92. The lever arm 108 is threadably attached to the slidable lens member 96, but yet may be swung a slight amount in its threadable attachment to the slidable portion 96. The lever arm 108 is maintained in a substantial normal position with respect to the base 92 by means of washers 112 and a spring 114 mounted between the washers 112. The biasing action provided by the spring 114, mounted around the lever arm 108 assists in maintaining the lever arm in a substantial normal position to the side wall of the base 92.

An upturned control handle 116 is provided at the extremity of the lever arm 108 and is positioned through the transverse slot 118 provided at one side of the front cover 34. Thus, by moving the control handle 116 to various positions within the slot 118, the lever arm 108 rides within the cam 110 thereby causing the slidable portion 96, which carries lenses, to move up and down and to focus the image being projected from the microphotograph 44. The steep cam slot 110 provides a large range of focusing with but a small movement of lever 108.

Also contained within the front compartment 22 is the electrical system for the reader 10. Specifically, a switch 111 is mounted on the inner surface of the top wall 38 of the front cover 34 and a transformer 61 is mounted on the inner surface of the bottom 14 of the base 12. The transformer 61, switch 111 and lamp 60 are electrically connected by wires (not shown) and are all operatively connected to a power source 113, which passes through an opening provided in the dividing wall 20.

The projected image passes through the lenses carried in the slidable member 96 and is directed against the reflector or mirror 120 which is mounted against the upwardly tilted lower wall 121 of the housing 88. The reflector 120 is in relatively close proximity to the focusing apparatus 86 and has relatively small dimensions. The reflector 120 is tilted in a fixed position on the bottom wall 121 of the housing 88 so that it not only readily receives the image projected from the microphotograph 44, but also so that it projects the image at a proper angle towards the second reflector 124.

The second reflector 124 is substantially larger in area than the first reflector 120 and is positioned on the inside surface of the cover 126 which is rotatably mounted at the rear end 128 of the base 12. The cover 126 includes an upper wall 130, downwardly directed side walls 132 and a downwardly directed rear wall 134. A hinge 136 is mounted along the inner surface of the rear wall 134 and also along the inner surface of the bottom 14 of the base 12, whereby the cover 126 is hingedly attached to the base 12. In order that the reflector 124 is properly positioned to receive the image projected from the first reflector 120, the cover 126 is rotated to and locked in the proper operating or open position by the toggle joints 138. The toggle joints 138 have their extremities pivotally attached at one end to the cover 126 and at the other end to the base 12. Thus, when the toggle joints 138 are locked in the full open position, as shown in FIGURE 5, the reflector 124 is in a proper position to receive the image projected from the first reflector 120 and to reflect the image to the viewing screen 140.

In the closed position, the cover 126 substantially encloses the rear compartment 24. Also, when the reader 10 is in the closed or transportable position, the viewing screen 140 is positioned within the rear compartment 24 so that the cover 126 encloses both the screen 140 and the first compartment 22. In the transporting position of the reader 10, the handle 32 may be rotated from the position of a stand to the carrying position for readily moving the microphotograph reader 10.

As with the base 12, the cover 126 preferably has black interior surfaces and may be constructed of any substantially rigid material, including metals, as magnesium or aluminum and molded plastic materials.

The viewing screen 140 is carried in a frame 142 having top wall 144, side walls 146, and a bottom wall 148. The screen 140 is pivotably mounted with respect to the rear compartment 24. Specifically the screen 140 is attached to the dividing wall 20 by means of a hinge 150 which is secured along the bottom wall 148 of the screen 140 and also along the upper flange 152 of the dividing wall 20. The viewing screen 140 is of conventional design and uses a special semi-specular screen material which provides clear viewing of the image being projected and gives the reader a very directional image from the second reflector 124. In order that the screen 140 is rotated to the proper operating or raised position, releasable, cooperating latching means, generally 153, are provided for locking the screen 140 at the proper attitude. Specifically spring clips 154 are secured to the side walls 146, and include outwardly hooked lower portions 156 which engage apertures 158 provided in the side walls 16 of the base 12.

From the above description, it is clear that a readily transportable, compact microphotograph reader is provided. This reader accomplishes the same results as larger and bulky microcard readers and yet may be easily stored in a drawer or other storage area when not in use. In the viewing position, the second reflecting means and the viewing screen are readily raised to and positively locked in proper position, whereby the image projected from the microphotograph down through the focusing means, against the first reflector to the second reflector, and finally to the viewing screen is seen as a clear, enlarged and undistorted image.

While in the foregoing there has been a detailed description of a specific embodiment of the present invention, it is to be understood that all equivalents obvious to those having skill in the art are to be included within the scope of the invention, as claimed.

What I claim and desire to secure by Letters Patent is:

1. A portable microphotograph viewer comprising, in combination: an elongated base having a transverse wall thereon that is positioned upright when the viewer is being used and which operates to divide said base generally into a first forward segment and a second rearward segment as located relative to each other and with the first segment being of substantially lesser length than the length of said second segment, casing means mounted on said base and cooperating with the base segments and said transverse wall to define a first generally enclosed compartment and a second elongated compartment above the base and within the laterally projecting confines of the upright wall, said base, transverse wall and casing means constituting compartment defining elements which substantially determine the size of compartments provided in said viewer, means defining an aperture opening through said casing means to said first compartment, a contact glass positioned in said aperture and being adapted to be contacted by the surface of a microphotograph, light means generally contained within said first compartment for directing light through said contact glass and against said microphotograph, means for focusing the image reflected from said microphotograph, a first reflecting means being adapted to reflect said image, said casing means including a cover pivotably mounted on said base and, in the closed position, being adapted to cooperate with said base to generally enclose said second compartment, a second reflecting means positioned on the inner surface of said cover and, when said cover is in the raised position, being adapted to receive and reflect the image projected from said first reflecting means, and an elongated viewing screen of such greater length than the height of said transverse wall pivotably mounted on one of the compartment defining elements heretofore recited and being adapted to be selectively swung to a stored-away position rearwardly of the upright wall and longitudinally within said elongated second compartment or to an operative, raised position, and when in said raised position being adapted to receive the image projected from said second reflecting means, whereby a desired portion of said microphotograph may be viewed.

2. The microphotograph viewer of claim 1 including pressure means for maintaining a microphotograph firmly against said contact glass, said pressure means including an elongated track member carried by the viewer, and a flat block member slidably positioned on the track member.

3. The microphotograph viewer of claim 1 wherein spring clips are secured to said viewing screen and apertures are provided in said base for engaging said clips whereby said screen is maintained in a fixed attitude relative to said base.

4. The viewer of claim 1 including means for locking said cover in a fixed raised position relative to said base and said screen and means for locking said viewing screen in a fixed raised position whereby said microphotograph is clearly viewed.

5. The device of claim 1 wherein venting slots are provided in spaced walls which define the first compartment in said casing means, thereby providing for circulation of air through said first compartment for cooling said light means contained in said first compartment.

6. A device of claim 5 wherein the venting slots are provided in upper and lower walls of the first compartment and means are provided pivotally mounted on said base for raising a portion of the viewer so that the venting slots in the lower wall are spaced above any surface upon which the viewer is rested, so as to assist in effecting circulation of air through said venting slots and through said first compartment.

7. The device of claim 1 wherein said second reflecting means, when in operative position is arranged in an upright attitude located rearwardly of said second compartment, and said viewing screen, when in operative position, is located at an upright attitude immediately rearwardly of said first compartment and spaced from said cover which carries said second reflecting means.

8. A microphotograph viewer comprising, in combination: an elongated base having first and second compartments, said second compartment being elongated relative to said first compartment; a dividing wall positioned between said first compartment and said second compartment, said dividing wall having a central recess; means for supporting said microphotograph in viewing position adjacent the exterior of said first compartment; said first compartment containing means for directing light against said microphotograph, and means for focusing the image reflected from said microphotograph, a central portion of said dividing wall being formed to project toward said first compartment to define a recess extension for said second compartment, and a first reflecting means in said recess extension for receiving and deflecting said image; a cover pivotably mounted at the end of said base which is opposite to the location of said first compartment and being adjacent to and adapted to enclose said second compartment; a second reflecting means positioned on the inner surface of said cover and, when said cover is in the raised position, being adapted to receive and reflect the image projected from said first reflecting means, and an elongated viewing screen pivotably mounted on said dividing wall and being pivotable in a direction opposite to that of said cover, said elongated screen being adapted to be positioned entirely within said elongated second compartment, below said cover and transverse to said dividing wall when in the closed position, and, when in the raised position, being adapted to receive the image projected from said second reflecting means, whereby the image from said microphotograph may be viewed.

References Cited by the Examiner

UNITED STATES PATENTS

| | | | |
|---|---|---|---|
| 2,424,339 | 7/1947 | Stechtbar et al. | 88—24 |
| 2,559,858 | 7/1951 | Elle et al. | 88—24 |
| 2,823,582 | 2/1958 | Gray | 88—24 |

FOREIGN PATENTS

| | | |
|---|---|---|
| 380,968 | 9/1923 | Germany. |

NORTON ANSHER, *Primary Examiner.*

V. A. SMITH, *Assistant Examiner.*